United States Patent
Kim et al.

(10) Patent No.: US 6,459,723 B1
(45) Date of Patent: Oct. 1, 2002

(54) DEVICE AND METHOD FOR REDUCING THE PEAK-TO-AVERAGE POWER RATIO OF A MOBILE STATION'S TRANSMIT POWER

(75) Inventors: Je-Woo Kim, Kyonggi-do; Young-Jun Hwang, Seoul; Soon-Young Yoon, Seoul; Jae-Heung Yeom, Seoul, all of (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/310,389

(22) Filed: May 12, 1999

(51) Int. Cl.[7] ............................................... H04B 1/707
(52) U.S. Cl. ................................................... 375/146
(58) Field of Search ............................... 375/130, 141, 375/142, 145, 146, 147, 149; 370/342

(56) References Cited

U.S. PATENT DOCUMENTS 5,237,587 A  *  8/1993  Schoolcraft ................. 375/142
5,729,570 A  *  3/1998  Magill ......................... 375/144
5,809,062 A  *  9/1998  Hulbert ....................... 375/147
6,317,422 B1 * 11/2001  Khaleghi et al. ........... 370/342

* cited by examiner

Primary Examiner—Don N. Vo
(74) Attorney, Agent, or Firm—Dilworth & Barrese, LLP

(57) ABSTRACT

A device and method are provided for reducing the peak-to-average power ratio of a mobile station's transmit power in a mobile communication system by spreading and modulating the transmission data by a complex spreading sequence. The complex spreading sequence is generated to have a plurality of chips and a phase difference of 90° between every two successive complex chips in response to each chip of a PN (Pseudo Noise) sequence. The device and method flexibly control the mobile transmit power by limiting its peak-to-average power ratio to a specific range and thus confining the mobile transmit power to a linear characteristic portion in a characteristic curve of a power amplifier. The phase of the complex spreading sequence is prevented from shifting by 180° (i.e., $\pi$) to maintain the mobile transmit power in the linear portion of the power amplifier characteristic curve.

20 Claims, 9 Drawing Sheets

DEVICE AND METHOD FOR REDUCING THE PEAK-TO-AVERAGE POWER RATIO OF A MOBILE STATION'S TRANSMIT POWER

PRIORITY

This application claims priority to an application entitled "Method and Device For Spreading and Modulation to Reduce Peak-to-Average Power Ratio of Mobile Transmit Power" filed in the Korean Industrial Property Office on May 12, 1998 and assigned Serial No. 98-17046, the contents of which are hereby incorporated by reference.

BACKGROUND OF THE INVENTION

1. Field of the Invention

The present invention relates generally to mobile communication systems, and in particular, to a device and method for reducing the peak-to-average power ratio of a mobile station's transmit power in a mobile communication system.

2. Description of the Related Art

A typical CDMA mobile communication system focuses on voice service, whereas a 3G mobile communication system provides the additional services of high quality voice, high speed data, moving pictures, and Internet browsing. In such a mobile communication system, a radio link consists of a forward link directed from a base station (BS) to a mobile station (MS) and a reverse link directed from the MS to the BS.

When zero-crossing occurs during spreading and modulation in a reverse link transmission (a phase variation is $\pi$), the peak-to-average power ratio of the mobile station's transmit power (mobile transmit power) increases, thereby producing regrowth. Regrowth adversely affects the communication quality of calls being made by other subscribers. Hence, the peak-to-average power ratio is a significant factor in the design and performance of a power amplifier in an MS.

Regrowth occurs due the existence of a linear portion and a non-linear portion in a characteristic curve of the mobile station's power amplifier. As the mobile transmit power increases, a transmit signal of the MS due to the non-linear characteristics generates interference in the frequency area of a different user causing the regrowth phenomenon.

Regrowth can be prevented by shrinking down a cell and sending a signal from an MS in the cell to a corresponding BS at a low power level. Thus, mobile transmit power can be flexibly controlled if the mobile station's peak-to-average power ratio can be limited to a specific range. However, it is not economical to physically shrink a cell, since more cells are then needed for a given area and each cell requires its own communications equipment.

SUMMARY OF THE INVENTION

Accordingly, an object of the present invention is to provide device and method for reducing the peak-to-average power ratio of a mobile station's transmit power in a mobile communication system.

Another object of the present invention is to provide a method of flexibly controlling mobile transmit power by limiting its peak-to-average power ratio to a specific range.

A further object of the present invention is to provide a method of flexibly varying a cell size in a mobile communication system to counteract regrowth.

A still further object of the present invention is to provide a method of enhancing auto-correlation characteristics of a multipath signal and cross-correlation characteristics relative to other users.

To achieve these and other objects, a device and method for reducing the peak-to-average power ratio of mobile transmit power in a mobile communication system are provided. The device and method spread mobile transmission data by a complex spreading sequence. The complex spreading sequence includes a plurality of chips and is generated to have a phase difference of 90° between every two successive complex chips in response to each chip of a PN (Pseudo Noise) sequence.

DETAILED DESCRIPTION OF PREFERRED EMBODIMENTS

Preferred embodiments of the present invention will be described herein below with reference to the accompanying drawings. In the following description, well known constructions or functions are not described in detail so as not to obscure the present invention.

The present invention includes the following novel and inventive features:

(1) mobile transmit power can be flexibly controlled by limiting its peak-to-average power ratio to a specific range and thus confining the mobile transmit power to a linear characteristic portion in a characteristic curve of a power amplifier;

(2) the phase of a complex spreading sequence is prevented from shifting by 180° (i.e., $\pi$) to maintain the mobile transmit power in the linear portion of the power amplifier characteristic curve;

(3) the phase difference between every two successive complex chips of a complex spreading sequence (PN$_I$ and PN$_Q$) is 90° (i.e., $\pi/2$) to limit the output power range of baseband filters and thereby, reduce the peak-to-average power ratio of mobile transmit power; and (4) auto-correlation characteristics of a multipath signal and cross-correlation characteristics relative to other users are improved by respreading a signal which has passed through a complex spreader by a spreading sequence PN$_2$ generated from a PN code generator.

It is to be appreciated in the embodiment of the present invention that "π DPSK (Differential Phase Shift Keying)" does not refer to a typical DPSK and is so named because the complex spreading sequence $PN_I+jPN_Q$ generated in the π/2 DPSK generator has a phase variation of π/2 for one chip duration.

Figure 1:
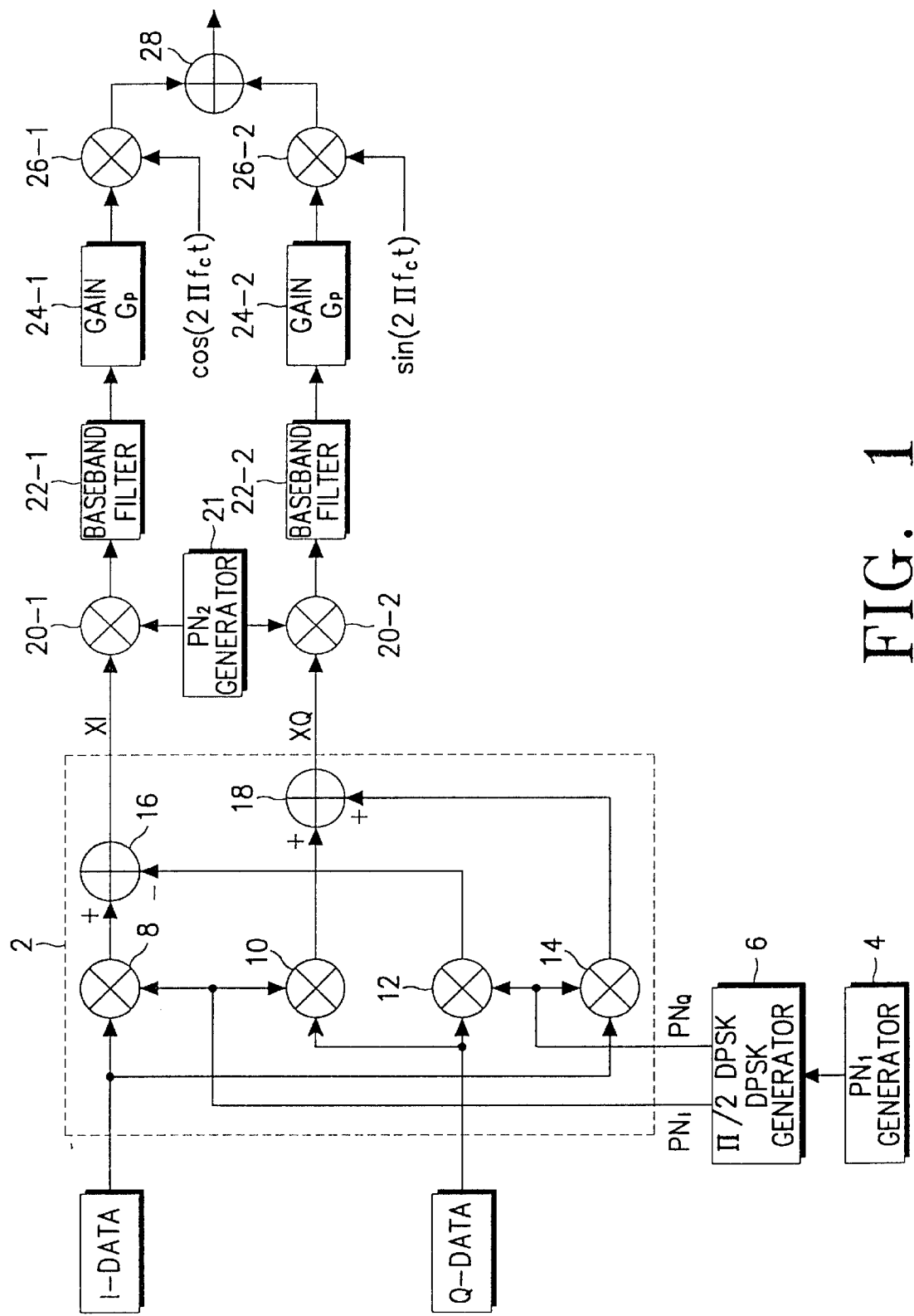
FIG. 1 is a block diagram of a mobile station for performing the spreading and modulating method according to an embodiment of the present invention.

With reference to FIG. 1, there is shown a schematic block diagram of a mobile station (MS) which will be referred to for describing methods of spreading and modulating mobile transmission data for reducing the peak-to-average power ratio of mobile transmit power according to embodiments of the present invention. A complex signal including inphase data I-data and quadrature-phase data Q-data is applied as a first input signal to a complex spreader 2. A $PN_1$ generator 4 generates a sequence $PN_I$ and a π/2 DPSK generator 6 generates complex spreading sequences $PN_I$ and $PN_Q$ with the sequence $PN_1$ received from the $PN_1$ generator 4. The complex spreading sequences $PN_I$ and $PN_Q$ are fed as a second input signal to the complex spreader 2. The embodiment of the present invention is characterised in that there is no zero-crossing since the phase difference between every two successive complex chips of the complex spreading sequence ($PN_I$ and $PN_Q$) is π/2. The structure and operation of the π/2 DPSK generator 6 is described in detail below with reference to FIGS. 2 to 5B.

In FIG. 1, the complex spreader 2 includes multipliers 8, 10, 12, and 14 and adders 16 and 18 for complex-spreading the complex signal by the complex spreading sequences $PN_I$ and $PN_Q$. A detailed description of the operation of the complex spreader 2 can be found in Korean Patent Application No. 98-7667 having a common assignee.

Multipliers 20-1 and 20-2 multiply the resulting in-phase spread signal XI and quadrature-phase spread signal XQ received from the complex spreader 2 by a sequence $PN_2$ generated from a $PN_2$ generator 21 for additional spreading. In the embodiment of the present invention, the sequences $PN_1$ and $PN_2$ are independent. It is contemplated that sequences $PN_1$ and $PN_2$ may entail a PN sequence generated by user identification code. And in this invention, multiplying the output of complex spreader 2 by $PN_2$ could be an optional feature.

The outputs of the multipliers 20-1 and 20-2 are subjected to baseband filtering by baseband filters 22-1 and 22-2, and to gain ($G_p$) control by gain controllers 24-1 and 24-2, respectively. Then, mixers 26-1 and 26-2 multiply the outputs of the gain controllers 24-1 and 24-2 by their respective corresponding carriers, $\cos(2\pi f_c t)$ and $\sin(2\pi f_c t)$, for frequency up-conversion, and an adder 28 sums the outputs of the mixers 26-1 and 26-2.

In accordance with the present invention, auto-correlation characteristic of a multipath signal and cross-correlation characteristics relative to other users are improved by spreading an input complex signal two times: once time by the sequence $PN_1$ and another time by the sequence $PN_2$. Here, the sequences $PN_1$, $PN_2$, $PN_I$, and $PN_Q$ have the same chip rate.

If the phase of a complex spreading sequence $PN_I+jPN_Q$ output from a spreading sequence generator drastically changes, for example, from 0° to 180°, it causes increase of the peak-to-average power ratio of mobile transmit power leads to regrowth and degrades the communication quality of a different user. However, the spreading sequence generator is configured that no zero-crossing (no phase variation of π) is produced in generating the complex spreading sequence $PN_I+jPN_Q$ in the embodiment of the present invention.

Figure 2:
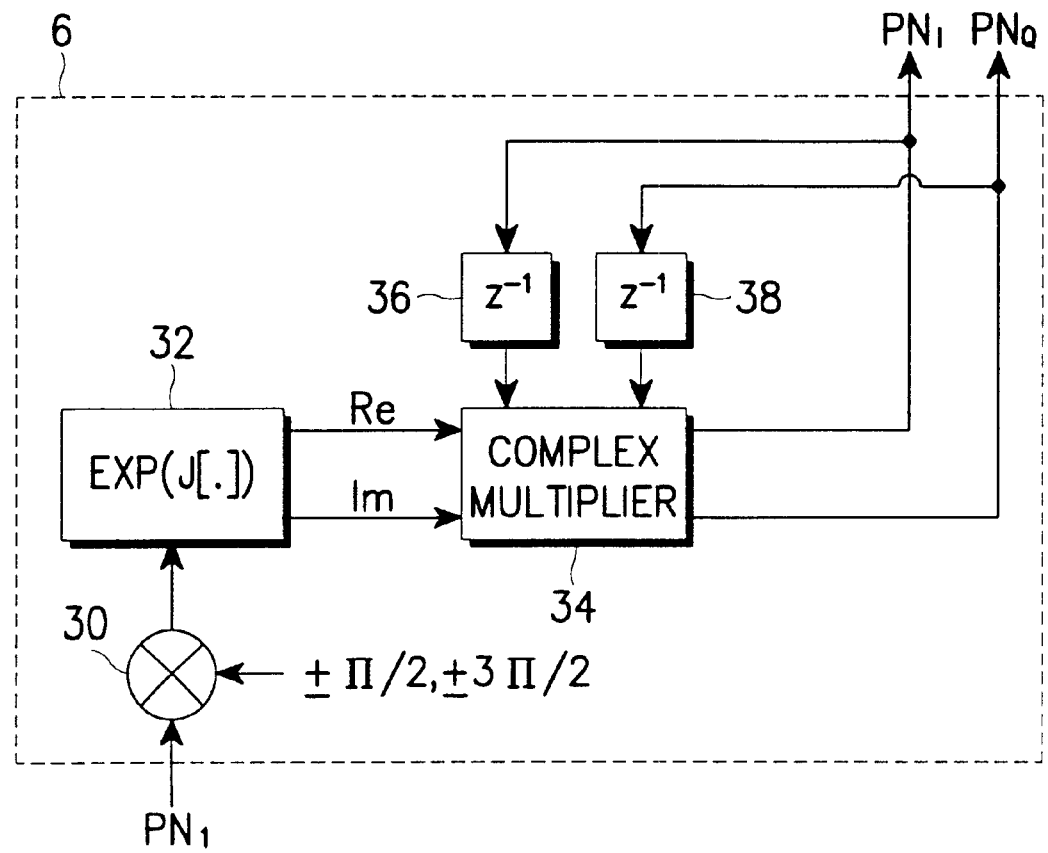
FIG. 2 is a block diagram of a first embodiment of a $\pi/2$ DPSK (Differential Phase Shift Keying) shown in FIG. 1.

FIG. 2 is a block diagram of the π/2 DPSK generator 6 provided as the spreading sequence generator according to the present invention. The feature of the π/2 DPSK generator 6 is that a maximum phase difference between every two successive complex chips of the complex spreading sequence $PN_I+jPN_Q$ is π/2.

The π/2 DPSK generator 6 includes a complex function calculator 32, a complex multiplier 34, and delay registers 36 and 38. A multiplier 30 multiplies every one the PN chip of the sequence $PN_1$ by $\mp\pi/2$ or $\mp 3\pi/2$. It is contemplated that the multiplier 30 multiplies the PN chips of the sequence $PN_1$ by any phase in the range of $\mp\pi/2$ or $\mp 3\pi/2$.

The complex function calculator 32 produces complex data Re+jIm by operating every one phase shifted PN chip output of the multiplier 30 in a complex function $\exp(j[\cdot])$. The complex multiplier 34 complex-multiplies the complex data Re+jIm by values (complex data) received from the delay registers 36 and 38 and outputs the complex spreading sequence $PN_I+jPN_Q$ chip unit. The delay register 36 stores the value $PN_I$ for one chip duration and the delay register 38 stores the value $PN_Q$ for one chip duration. The initial values (complex data) of the delay registers 36 and 38 are determined by $$\text{delay register } 36 = Re[\exp(j\theta)]$$

$$\text{delay register } 38 = Im[\exp(j\theta)], \hspace{2em} \text{(Equation 1)}$$

where θ may be any value, preferably π/4.

Assuming that the consecutive chips of the sequences $PN_1$ and $PN_2$ are $\{1, -1, 1, -1, \ldots\}$ and $\{-1, 1, -1, 1, \ldots\}$, respectively, and the initial values of the delay registers 36 and 38 are 1, the consecutive chips of the complex spreading sequence $PN_I+jPN_Q$ generated from the π/2 DPSK generator 6 are $\{(-1+j), (1+j), (-1+j), (1+j), \ldots\}$, and the consecutive of a complex spreading sequence input to the baseband filters 22-1 and 22-2 are $\{(1-j), (1+j), (1-j), (1+j), \ldots\}$. The sequences $PN_1$ and $PN_2$ can be long codes for user identification in the 3G CDMA system.

Figure 3A:
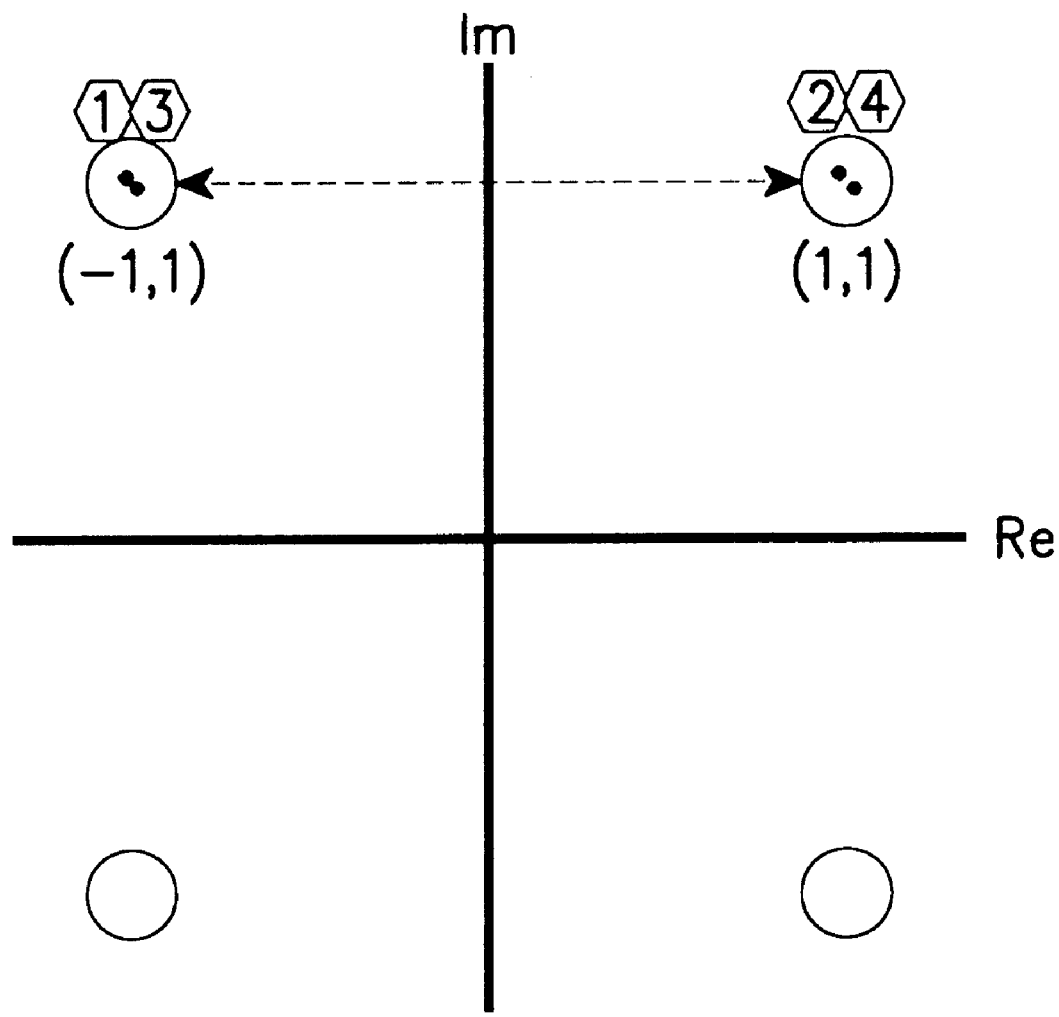
FIGS. 3A and 3B illustrate signal constellation and phase transition of complex spreading sequences according to the structure of the $\pi/2$ DPSK generator shown in FIG. 2.
Figure 3B:
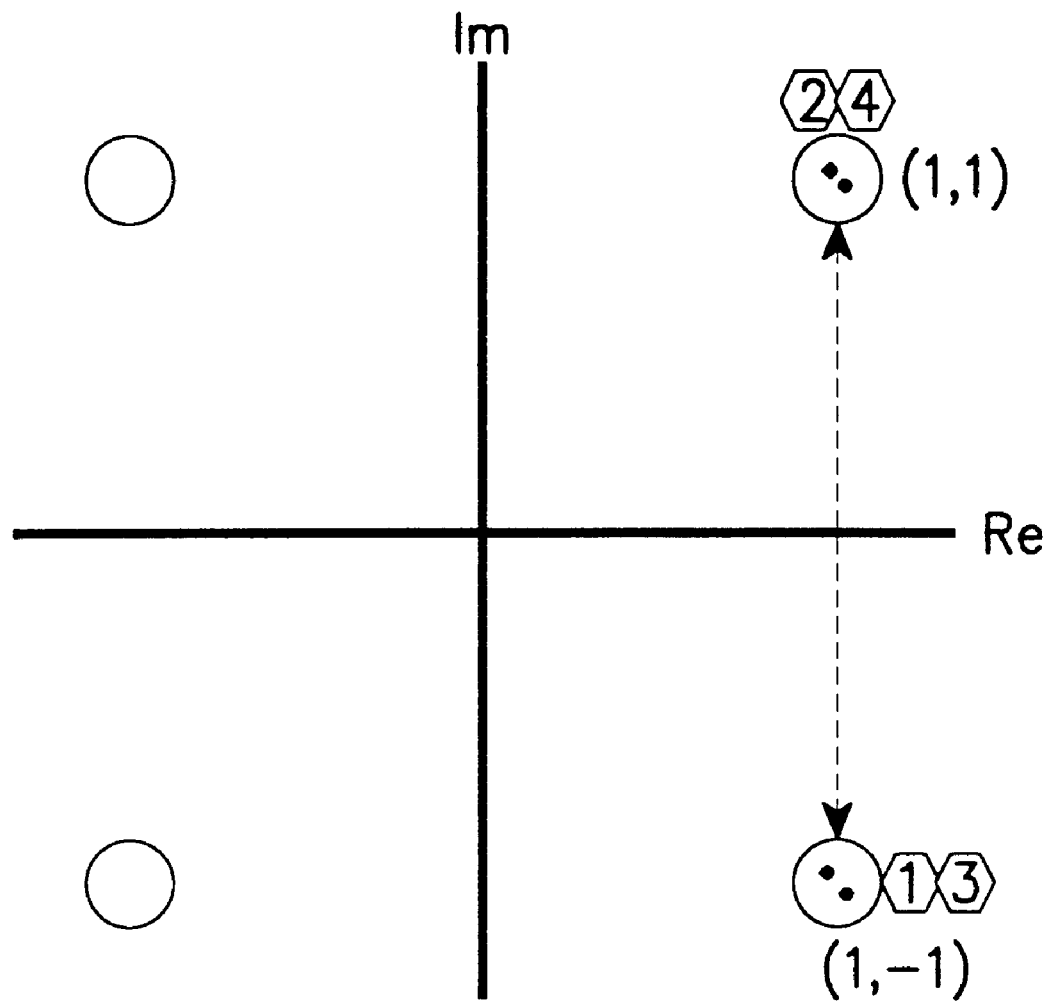

FIGS. 3A and 3B illustrate signal constellations and phase transitions of the complex spreading sequence $PN_I+jPN_Q$ output from the π/2 DPSK generator 6 and the complex spreading sequence input to the baseband filters 22-1 and 22-2, respectively. Referring to FIGS. 1 to 3B, for the first PN chip 1 of the sequence $PN_1$, the output of the multiplier 30 in the π/2 DPSK generator 6 is π/2 since the other input to the multiplier 30 is π/2, and the complex data output from the complex function calculator is $$e^{j\frac{\pi}{2}}$$

expressed as (0+1j) in the complex numeral form (Re+jIm). Therefore, the complex multiplier 34 produces complex data $(-1+j)=(0+j)\times(1+j)$. Here, (0+j) is the complex data output from the complex function calculator 32 and (1+j) is the initial values of the delay registers 36 and 38.

In FIG. 3A, the complex data $(-1+j)$ exists in the second quadrant of an orthogonal coordinates graph defined by real components (Re) and imaginary components (Im) of a complex signal. The real part $-1$ of the complex data $(-1+j)$ is stored in the delay register 36 for one chip duration, and the imaginary part 1 is stored in the delay register 38 for one chip duration.

For the second PN chip $-1$ of the sequence $PN_1$, the output of the multiplier 30 in the π/2 DPSK generator 6 is $-\pi/2$, and the complex data output from the complex function calculator 32 is $$e^{-j\frac{\pi}{2}}$$

expressed as (0−j) in the complex numeral form (Re+jIm). Therefore, the complex multiplier 34 produces complex data (1+j)=(0−j)×(−1+j). Here, (0−j) is the complex data output from the complex function calculator 32 and (−1+j) is the previous values of the delay registers 36 and 38.

In FIG. 3A, the complex data (1+j) exists in the first quadrant of the orthogonal coordinates graph. The real part 1 of the complex data (1+j) is stored in the delay register 36 for one chip duration, and the imaginary part 1 is stored in the delay register 38 for one chip duration. In this manner, the complex data output from the complex multiplier 34 is (−1+j) for the third PN chip 1 of the sequence $PN_1$, and (1+j) for the fourth PN chip −1 of the sequence $PN_1$.

With continued reference to FIG. 3A, the complex spreading sequence $PN_I+jPN_Q$ exists in the second and first quadrants of the orthogonal coordinates graph defined by the real components (Re) and the imaginary components (Im) of a complex signal, with a phase difference of π/2 between every two successive complex chips.

The π/2 phase difference between every two successive complex chips is maintained in a complex spreading sequence obtained by respreading the sequence $PN_2$. Referring to FIG. 1, a complex spreading sequence {(1−j), (1+j), (1−j), (1+j), ... } is produced by multiplying the chips {(−1+j), (1+j), (−1+j), (1+j), ... } of the complex spreading sequence $PN_I+jPN_Q$ by the chips {−1, 1, −1, 1, ... } of the sequence $PN_2$. As shown in FIG. 3B, the complex spreading sequence input to the baseband filters 22-1 and 22-2 has the phase difference of π/2 between every two successive complex chips like the complex spreading sequence $PN_I+jPN_Q$.

Since the phase difference between every two successive complex chips of the complex spreading sequences is small, that is, π/2 as noted by FIGS. 3A and 3B, the peak-to-average power ratio of mobile transmit power after processing in the baseband filters 22-1 and 22-2 is reduced, decreasing the influence of regrowth. As a result, communication quality and performance are improved.

If a predetermined radian value input to the multiplier 30 of the π/2 DPSK generator 6 is −3π/2, the complex spreading sequence $PN_I+jPN_Q$ also shows the signal constellation of FIG. 3A. If the radian value is −π/2 or 3π/2, the chips of the complex spreading sequence $PN_I+jPN_Q$ are successively shown at the same positions in the alternating first and second quadrants, starting from the first quadrant in FIG. 3A.

Figure 4:
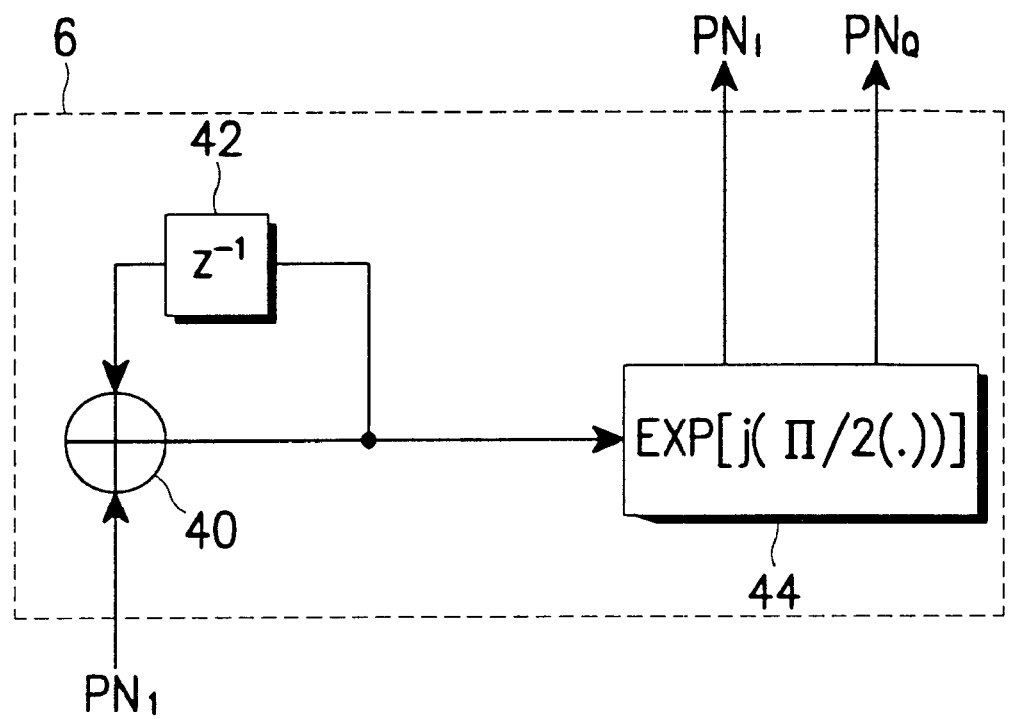
FIG. 4 is a block diagram of a second embodiment of a $\pi/2$ DPSK generator shown in FIG. 1.

FIG. 4 is a block diagram of a second embodiment of the π/2 DPSK generator 6 shown in FIG. 1. As with the first embodiment, the maximum phase difference between every two successive complex chips of the complex spreading sequence $PN_I+jPN_Q$ is ±π/2. The π/2 DPSK generator 6 of the second embodiment includes an adder 40, a delay register 42, and a complex function calculator 44. The adder 40 adds a PN chip of the sequence $PN_I$ with the previous output of the adder 40 stored in the delay register 42. It is preferable to set the initial value of the delay register 42 to 1/2. The complex function calculator 44 produces the complex spreading sequence $PN_I+jPN_Q$ by operating the output of the adder 40 in a complex function exp[(j(π/2(·))].

The phase variation of the complex spreading sequence $PN_I+jPN_Q$ is given by $$\angle\left(PN_I^{(k)} + jPN_Q^{(k)}\right) \equiv \theta(k) \quad \text{(Equation 2)}$$

$$\theta(k) = \theta(k-1) + \frac{\pi}{2} PN_I.$$

It is noted from equation (2) that the phase in the current chip of the complex spreading sequence $PN_I+jPN_Q$ is the sum of the phase in the previous chip thereof and the product of the current chip of the sequence $PN_I$ by π/2.

Assuming that the consecutive chips of the sequences $PN_1$ and $PN_2$ are {1, −1, 1, −1, ... } and {−1, 1, −1, 1, ... }, respectively and the initial value of the delay register 42 is 1/2, then the consecutive chips of the complex spreading sequence $PN_I+jPN_Q$ generated from the π/2 DPSK generator 6 are {(−1+j), (1+j), (−1+j), (1+j), ... }, and the consecutive chips of the complex spreading sequence input to the baseband filters 22-1 and 22-2 are {(1−j), (1+j), (1−j), (1+j), ... }. The sequences $PN_1$ and $PN_2$ can be long codes for user identification in the 3G CDMA system.

Figure 5A:
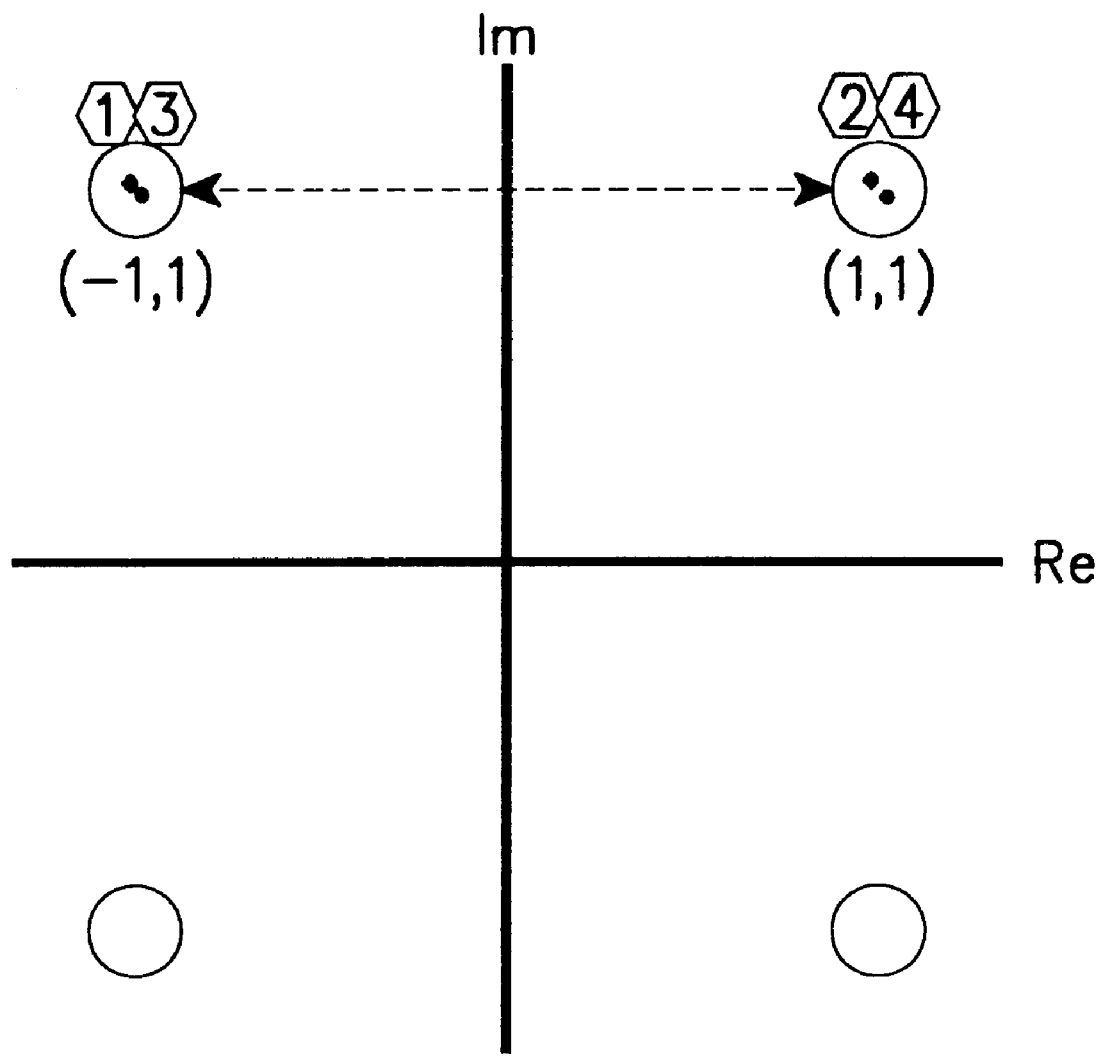
FIGS. 5A and 5B illustrate signal constellation and phase transition of complex spreading sequences according to the structure of the $\pi/2$ DPSK generator shown in FIG. 4.
Figure 5B:
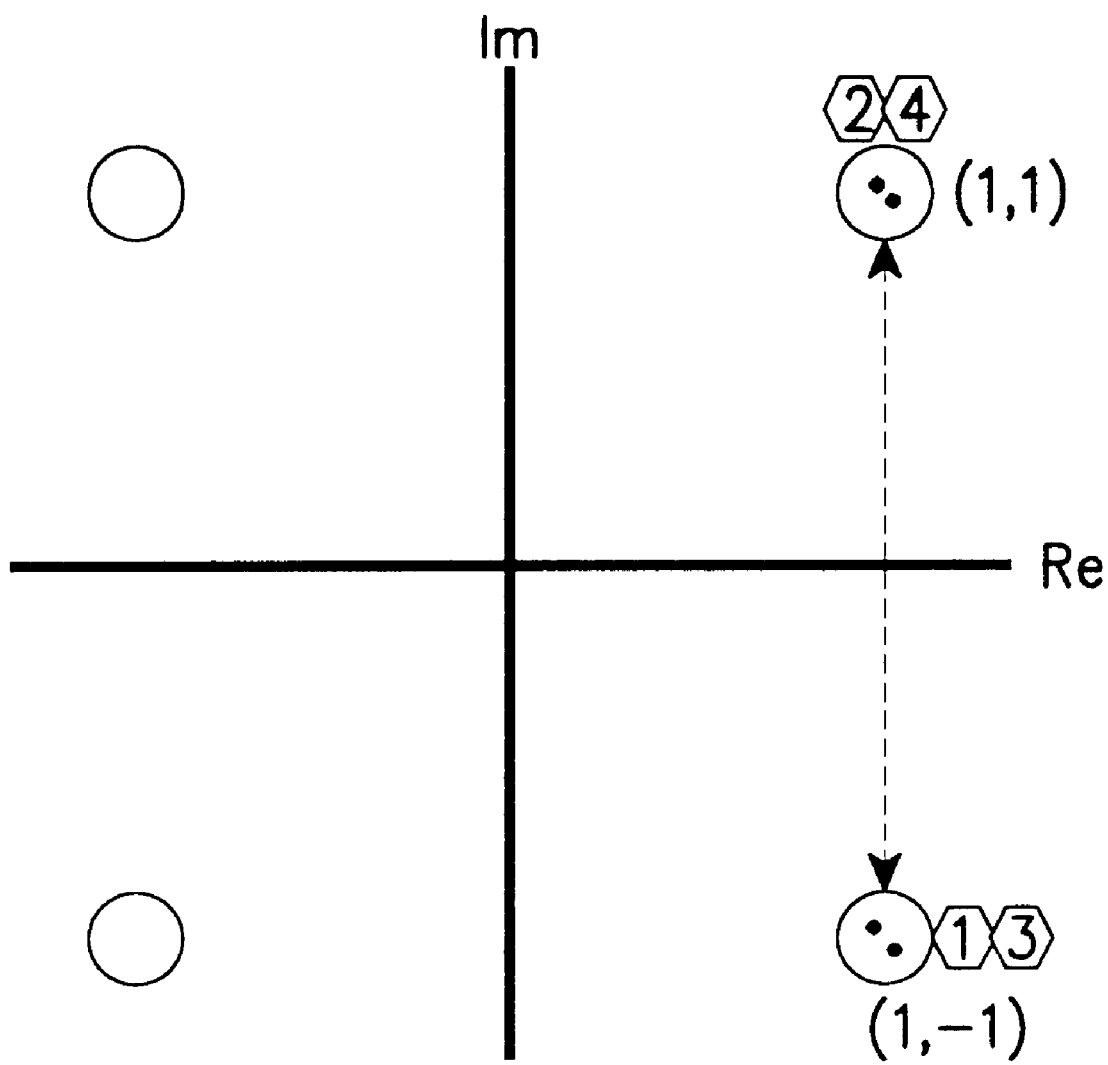

FIGS. 5A and 5B are views illustrating the signal constellations and phase transitions of the complex spreading sequence $PN_I+jPN_Q$ output from the π/2 DPSK generator 6 and the complex spreading sequence input to the baseband filters 22-1 and 22-2, respectively.

Referring to FIGS. 1 to 5B, for the first PN chip 1 of the sequence $PN_1$, the output of the adder 40 is 3/2 (=1+1/2), which is stored in the delay register 42 for one chip duration, and the complex data output from the complex function calculator 44 is $$e^{j\frac{3\pi}{4}}$$

expressed as (−1+j) in the complex numeral form (Re+jIm), and a chip of the complex spreading sequence $PN_I+jPN_Q$. Here, (−1+j) exists in the second quadrant of an orthogonal coordinates graph shown in FIG. 5A.

For the second PN chip −1 of the sequence $PN_1$, the output of the adder 40 is 1/2 (=−1+3/2), which is stored in the delay register 42 for one chip duration, and the complex data output from the complex function calculator 44 is $$e^{j\frac{\pi}{4}}$$

expressed as (1+1j) in the complex numeral form (Re+jIm). Here, (1+1j) is present in the first quadrant of the orthogonal coordinates graph shown in FIG. 5A. In this manner, the complex data output from the complex function calculator 44 is (−1+j) for the third PN chip 1 of the sequence $PN_I$, and (1+j) for the fourth PN chip −1 of the sequence $PN_1$.

With continued reference to FIG. 5A, the complex spreading sequence $PN_I+jPN_Q$ exists in the second and first quadrants of the orthogonal coordinates plane defined by the real components (Re) and the imaginary components (Im) of a complex signal, with a phase difference π/2 between every two successive chips.

The phase difference of π/2 between every two successive complex chips is maintained in a complex spreading sequence obtained by respreading the complex spreading sequence $PN_I+jPN_Q$ by the sequence $PN_2$ (It is noted that the complex spreading sequence can also be respread by the original sequence PN or a different PN sequence.). Referring to FIG. 1, a complex spreading sequence {(1−j), (1+j), (1−j), (1+j), ... } is produced by multiplying the chips {(−1+j), (1+j), (−1+j), (1+j), ... } of the complex spreading sequence $PN_I+jPN_Q$ by the chips {−1, 1, −1, 1, ... } of the sequence PN$_2$. As shown in FIG. 5B, the complex spreading sequence input to the baseband filters 22-1 and 22-2 has the phase difference π/2 between every two successive complex chips like the complex spreading sequence PN$_I$+jPN$_Q$.

Since the phase difference between every two successive complex chips of the complex spreading sequence is small, that is, π/2 as noted from FIGS. 5A and 5B, the peak-to-average power ratio of mobile transmit power after processing in the baseband filters 22-1 and 22-2 is reduced, thereby, counteracting the regrowth phenomenon. As a result, communication quality and performance are improved.

Figure 6:
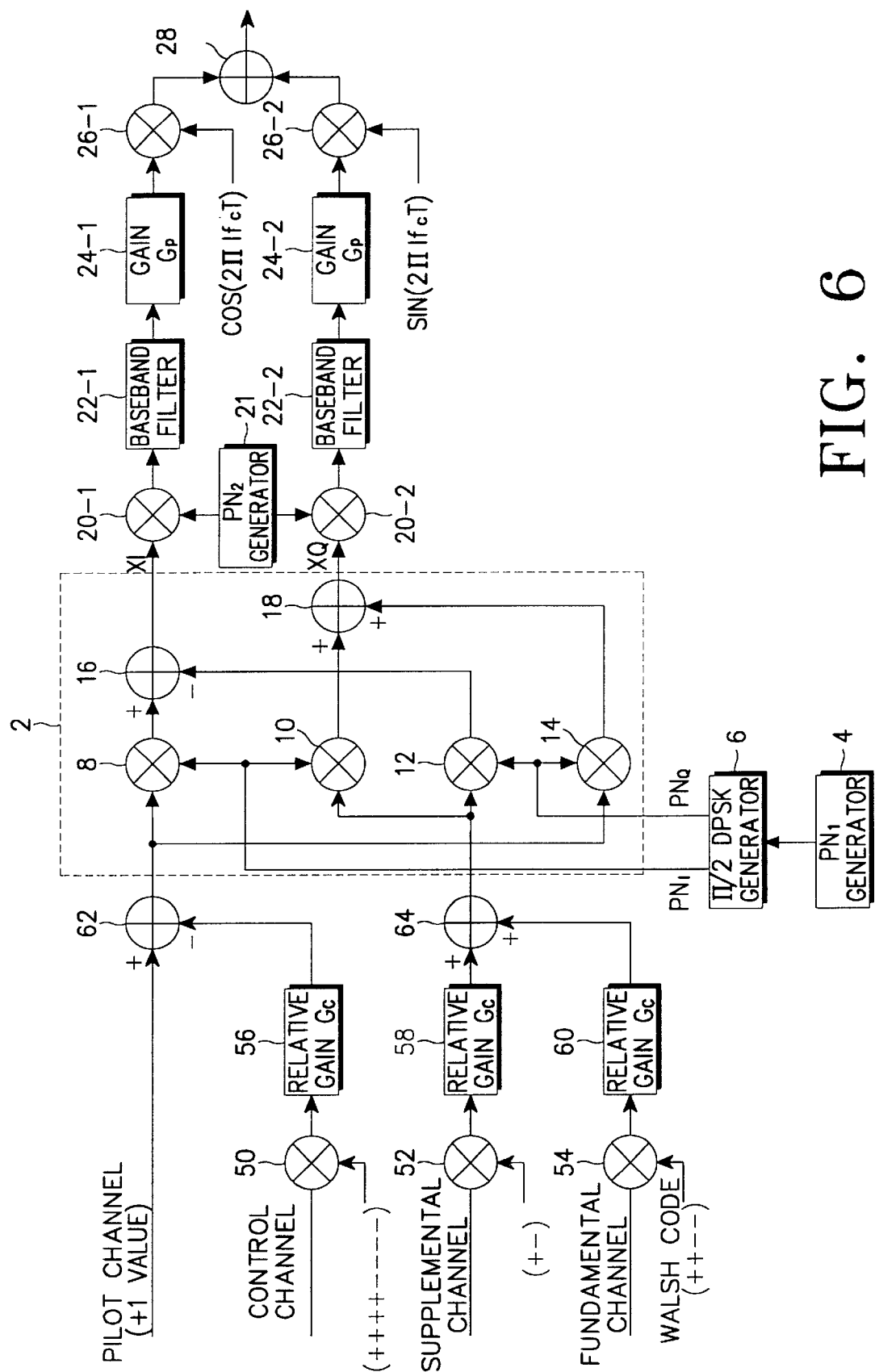
FIG. 6 is a block diagram of a mobile station in a 3G IS-95 system to which the spreading and modulating method according to the present invention is applied.

FIG. 6 is a block diagram of an MS in a 3G IS-95 system to which the spreading and modulation method according to the embodiment of the present invention is applied. Reverse communication channels are comprised of a pilot channel which is always activated, a control channel, a fundamental channel deactivated in a specific frame, and a supplemental channel. The pilot channel is unmodulated and used for performing initial acquisition, time tracking, and synchronization of a rake receiver. This allows reverse-link closed-loop power control. A dedicated control channel transmits an uncoded fast power control bit and coded control information. The two types of information are multiplexed and sent on one control channel. The fundamental channel is used to send RLP (Radio Link Protocol) frames and packet data.

The channels are spread by Walsh codes for orthogonal channelization. Control, supplemental, and fundamental channel signals are multiplied by corresponding Walsh codes in multipliers 50, 52, and 54, respectively. Relative gain controllers 56, 58, and 60 control the relative gains Gc of the outputs of the multipliers 50, 52, and 54, respectively. An adder 62 adds a pilot channel signal with a control channel signal received from the relative gain controller 56. The added information of the adder 62 is applied as an I-channel signal. An adder 64 adds a supplemental channel signal output from the relative gain controller 58 with a fundamental channel signal output from the relative gain controller 60. The added information of the adder 64 is assigned as a Q-channel signal.

A signal sent on the pilot, dedicated control, fundamental, and supplemental channel signals is a complex signal as shown in FIG. 1. The sum of the pilot channel and the control channel is assigned as the I-channel, and the sum of the fundamental channel and the supplemental channel is assigned as the Q-channel. The complex signal of the I and Q channels is complex-spread by the complex spreading sequence PN$_I$+jPN$_Q$ in the complex spreader 2 of FIG. 6. The complex-spread signal is multiplied by the sequence PN$_2$, that is, a long code for user identification. The resulting complex spreading sequence is subjected to baseband filtering in the baseband filters 22-1 and 22-2, and sent through the gain controllers 24-1 and 24-2, the mixers 26-1 and 26-2, and the adder 28 with a low peak-to-average power ratio.

Figure 7:
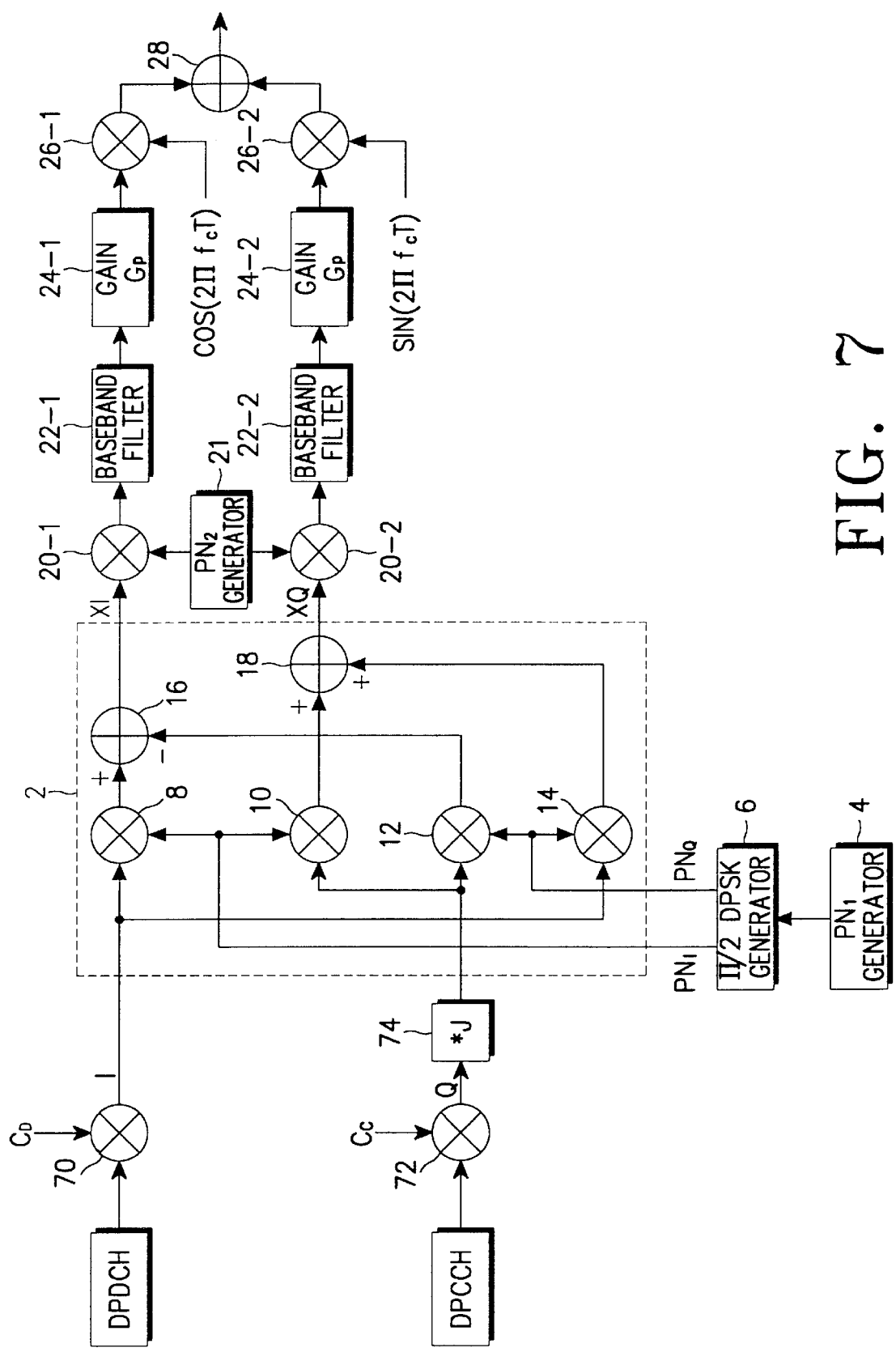
FIG. 7 is a block diagram of a mobile station in a W-CDMA (Wideband Code Division Multiple Access) system to which the spreading and modulating method according to the present invention is applied.

FIG. 7 is a block diagram of an MS in a W-CDMA system to which the spreading and modulating method of the present invention is applied. In FIG. 7, a traffic signal is sent on a dedicated physical data channel (DPDCH), and a control signal is sent on a dedicated physical control channel (DPCCH). The DPDCH is multiplied by a channelization code C$_D$ at a chip rate in a multiplier 70 and assigned as an I channel. The DPCCH is multiplied by a channelization code C$_C$ at a chip rate in a multiplier 72, converted to an imaginary numeral form by an imaginary operand (·j) 74, and assigned as a Q channel. Here, C$_D$ and C$_C$ are mutually orthogonal codes. The I and Q channels form a complex signal. The complex signal is complex-spread by the complex spreading sequence PN$_I$+jPN$_Q$ in the complex spreader 2 of FIG. 7, and multiplied by the sequence PN$_2$; that is, a long code for user identification generated in the PN$_2$ generator 21. The resulting complex spreading sequence is subject to baseband filtering in the baseband filters 22-1 and 22-2, and sent through the gain controllers 24-1 and 24-2, the mixers 26-1 and 26-2, and the adder 28 with a low peak-to-average power ratio.

According to the present invention as described above, the peak-to-average power ratio of mobile transmit power is limited to a specific range by ensuring a phase difference of 90° between every two successive complex chips of a complex spreading sequence. Therefore, the mobile transmit power appears only in a linear portion of a characteristic curve of a power amplifier, thereby allowing the mobile transmit power and the cell size to be flexibly controlled. In addition, auto-correlation characteristics of a multipath signal and cross-correlation characteristics relative to other users can be improved by respreading a signal which has passed through a complex spreader by another PN sequence generated from a PN code generator.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for reducing the peak-to-average power ratio of a mobile station's transmit power in a mobile communication system, comprising the steps of:

generating a complex spreading sequence having a plurality of chips and a phase difference of 90° between every two successive complex chips in response to each chip of a PN (Pseudo Noise) sequence, wherein the complex spreading sequence multiplies each of converted complex data by previously converted complex data and generates a complex spreading sequence; and spreading and modulating mobile transmission data by the complex spreading sequence.

2. The method of claim 1, wherein the step of generating the complex spreading sequence comprises the steps of:

multiplying the chips of the PN sequence by a predetermined phase value to produce phase shifted chips;

converting the phase shifted chips to complex data using each of the phase shifted chips as a phase; and multiplying the converted complex data by previously converted complex data to generate the plurality of chips of the complex spreading sequence.

3. The method of claim 2, wherein the step of converting uses a complex function exp(j[·]) to convert the phase shifted chips to complex data.

4. The method of claim 2, wherein the predetermined phase value is within the range of ∓π/2 to ∓3π/2.

5. The method of claim 1, wherein the step of generating the complex spreading sequence comprises the steps of:

adding every chip of the PN sequence with a respective pre-stored chip to obtain added chips; and converting the added chips to complex data to generate the plurality of chips of the complex spreading sequence.

6. The method of claim 5, wherein the step of converting uses a complex function exp[j(π/2(·))] to convert the added chips to complex data.

7. The method of claim 1, further comprising the step of respreading the spread and modulated mobile transmission data by an independent PN sequence.

8. A device for reducing the peak-to-average power ratio of a mobile station's transmit power in a mobile communication system, comprising:

a complex spreading sequence generator for generating a complex spreading sequence having a plurality of chips and a phase difference of 90° between every two successive complex chips in response to each chip of a PN sequence; and a spreader for spreading and modulating mobile transmission data by the complex spreading sequence.

9. The device of claim 8, wherein the complex spreading sequence generator comprises:

a multiplier for multiplying the chips of the PN sequence by a predetermined phase value to produce phase shifted chips;

a complex data generator for converting the phase shifted chips to complex data using each of the phase shifted chips as a phase; and a complex multiplier for generating the plurality of chips of the complex spreading sequence by multiplying the converted complex data by previously converted complex data.

10. The device of claim 9, wherein a complex function $\exp(j[\cdot])$ is used in converting the phase shifted chips to complex data.

11. The device of claim 9, wherein the predetermined phase value is within the range of $\mp\pi/2$ and $\mp 3\pi/2$.

12. The device of claim 8, wherein the complex spreading sequence generator comprises:

an adder for adding every chip of the PN sequence with a respective pre-stored chip to obtain added chips; and a complex data generator for generating the plurality of chips of the complex spreading sequence by converting the added chips to complex data.

13. The device of claim 12, wherein a complex function $\exp[j(\pi/2(\cdot))]$ is used in converting the added chips to complex data.

14. The device of claim 8, further comprising a re-spreader for respreading the spread and modulated mobile transmission data by an independent PN sequence.

15. The device of claim 14, wherein the independent PN sequence is identical to the PN sequence.

16. A device for reducing the peak-to-average power ratio of a mobile station's transmit power in a mobile communication system, comprising:

complex spreading sequence generating means for generating a complex spreading sequence having a plurality of chips and a phase difference of 90° between every two successive complex chips in response to each chip of a PN sequence; and spreading means for spreading and modulating mobile transmission data by the complex spreading sequence.

17. The device of claim 16, wherein the complex spreading sequence generating means comprises:

multiplying means for multiplying the chips of the PN sequence by a predetermined phase value to produce phase shifted chips;

complex data generating means for converting the phase shifted chips to complex data using each of the phase shifted chips as a phase; and complex multiplying means for generating the plurality of chips of the complex spreading sequence by multiplying the converted complex data by previously converted complex data.

18. The device of claim 17, wherein the predetermined phase value is within the range of $\mp\pi/2$ and $\mp 3\pi/2$.

19. The device of claim 16, wherein the complex spreading sequence generating means comprises:

adding means for adding every chip of the PN sequence with a respective pre-stored chip to obtain added chips; and complex data generating means for generating the plurality of chips of the complex spreading sequence by converting the added chips to complex data.

20. The device of claim 16, further comprising re-spreading means for respreading the spread and modulated mobile transmission data by an independent PN sequence.

* * * * *